Patented May 9, 1939

2,157,965

UNITED STATES PATENT OFFICE 2,157,965

PROCESS FOR PRODUCING PHTHALIC ANHYDRIDE

Alfred Pongratz, Graz, Germany, assignor to Helmuth Reichhold, Detroit, Mich., doing business as Reichhold Chemicals No Drawing. Application October 27, 1938, Serial No. 237,317. In Austria June 28, 1937

10 Claims. (Cl. 260—342)

My invention relates to a process of catalytically oxidizing naphthalene to phthalic anhydride in the vapor phase and to the production of an improved oxidation catalyst for use in connection therewith.

It is known that naphthalene may be catalytically oxidized in the vapor phase by means of oxygen containing gases in the presence of vanadium oxides or other vanadium compounds. Depending on the temperature, the proportion of the reaction components, naphthalene and oxygen, and the distribution of the catalyst, the oxidized products predominantly consist of naphthoquinones or phthalic acid and its anhydride respectively besides water and carbonic acid; or a more or less complete destruction predominantly or completely leads to the formation of the last named substances.

I have now found that combining certain vanadium compounds and titanium compounds yields catalysts of surprising efficiency. These may be prepared by bringing into mutual interaction on the one hand basic titanium salts such as titanylsulfate, titanium oxychloride and the like, and on the other alkali metal or ammonium salts of the vanadic acids in watery suspension or solution respectively. While the colors changed in a characteristic way, water insoluble intensively colored compounds were formed thereby which presumably were titanylvanadates. By depositing this precipitate on a suitable carrier substance such as pumice stone which may be present during the precipitation, and by suitably eliminating the water and water soluble reaction products and heating to about 360° C. in a rotating drum a highly effective catalyst is obtained.

The principal technical importance of the new catalyst resides in its excellent capacity to oxidize naphthalene to phthalic anhydride even at comparatively low temperatures. Below about 285° C., in addition to phthalic anhydride, only small traces of the intensively colored naphthoquinones appear which, as is known, impair to a considerable extent the further use of the phthalic anhydride, while above the said temperature within a rather wide temperature range of about 50° C., phthalic anhydride is obtained in a very pure state and in excellent yield, such product remaining constant. This efficiency is practically independent of the ratio of the naphthalene to the air or oxygen in the gas mixture passing over the catalyst. Thus even when deviating to a large extent from the theoretically optimal proportion neither a disturbing formation of naphthoquinones nor losses owing to total destruction, exceeding the unavoidable amount take place. A further advantage of the new catalyst consists in the unusually short time it requires to become activated and in the long time it remains active, so that from the initial charging of the apparatus a product of highest purity is obtained in excellent yield.

The advantages of the new process as compared with prior processes are obvious. When employing the hitherto used vanadium containing catalysts temperatures of at least 370–420° C. must be applied in order to avoid the appearance of the disturbing naphthoquinones, which of course is an item of considerable importance in connection with the initial cost of the apparatus, the materials of which it may be built, and its ultimate durability. Furthermore the heretofore known catalysts reach their maximum efficiency only after being in action during many hours (up to several weeks) so that initially phthalic anhydride is obtained only in low yield and strongly contaminated with naphthoquinones.

It is true, according to Maxted (J. Soc. Chem. Ind., 1928, 104 T) when using tin vanadate as catalyst under certain conditions phthalic anhydride is said to be obtained even at 250° C.; it is apparent however from the same literature that the yields are impaired to a large extent when the ratio between naphthalene and air is altered, and still more by even slight temperature changes. Since the catalytic oxidation of naphthalene, as is known, is a strongly exothermic reaction this treatment must be carried out with careful cooling. Strict control of the cooling process, however, causes great technical difficulties. The above mentioned comparatively great insensibility of the new catalyst to often unavoidable temperature changes of course means an advantage which cannot be too highly appreciated.

Moreover when attempting to use tin vanadate as catalyst it is found that it becomes efficacious only at 325° C. and that the yield of phthalic anhydride is comparatively low.

It has been further found that instead of the basic titanium salts, basic zirconium salts, such as e. g. zirconium oxychloride, and alkali salts or ammonium salts of the vanadic acids may also be advantageously brought into mutual interaction in the manner described above, catalysts of particular efficiency being thus obtained. These have the optimum of efficiency at temperatures between 330 and 360° C. and are also to a large degree independent of the proportions of the naphthalene air mixture.

Example 1

A hot saturated solution of 117 parts of ammonium meta-vanadate is quickly added to a suspension of 160 parts of titanyl sulfate in 1600 parts of water while stirring. The originally white suspension immediately becomes lemon yellow but at boiling temperature turns orange after a few minutes. After 15 to 20 minutes heating the reaction mixture is quickly cooled, filtered and washed several times with water; the residue which is of deep orange color is suspended in water, sprayed onto 2000–4000 parts of pumice stone in a rotating drum, and dehydrated by gradually heating up to 360°. The catalyst thus obtained is of pale pea-green color and at temperatures between 290° and 330° C. gives excellent yields remaining constant of pure phthalic anhydride.

Increasing the quantity of ammonium vanadate when preparing the catalyst is disadvantageous showing definitely that the catalytic effect is due to the titanium vanadate and not to small traces of excess free vanadium pentoxide formed by decomposition of ammonium meta vanadate.

Example 2

A hot saturated solution of 117 parts of ammonium vanadate is added to a cold saturated solution of 160 parts of $ZrOCl_2.8$ aq while stirring whereby an egg-yellow precipitate is formed which is sprayed onto 4000 parts of pumice stone in a preparing drum (Präpariertrommel). The temperature is then raised to 370° C.; the color changes from ocher-yellow into mignonette-green; at this time all of the ammonium chloride is sublimated off. Mixtures of naphthalene vapor and air are oxidized to phthalic anhydride at temperatures between 330° and 360°.

I claim:

1. A process of catalytically oxidizing naphthalene to phthalic anhydride, which comprises conducting a mixture of naphthalene vapor and air over a catalyst which consists of a precipitate obtained by combining a vanadate of a group consisting of alkali metal and ammonium vanadates with a member of a group consisting of basic titanium salts and zirconium salts in aqueous solution or suspension, said precipitate having been brought on a suitable carrier substance and dehydrated by heating.

2. A process as claimed in claim 1, wherein a basic titanium salt is included in the catalyst and the oxidation is carried out at temperatures between 285–330° C.

3. A process as claimed in claim 1, wherein a basic zirconium salt is included in the catalyst and the oxidation is carried out at temperatures between 330–360° C.

4. A process of catalytically oxidizing naphthalene to phthalic anhydride, which comprises conducting a mixture of naphthalene vapor and air over a mixed catalyst comprising (1) a member of a group consisting of alkali metal and ammonium vanadates and (2) a member of a group consisting of titanium and zirconium oxychlorides and oxysulphates.

5. A process as claimed in claim 4, wherein titanyl sulfate is included in the catalyst and the oxidation is carried out at temperatures between 285–330° C.

6. A process as claimed in claim 4, wherein zirconium oxychloride is included in the catalyst and the oxidation is carried out at temperatures between 330–360° C.

7. A vapor phase oxidation catalyst wherein the active portion comprises a mixture of (1) a vanadium compound selected from a group consisting of alkali metal and ammonium vanadates and (2) at least one member of a group consisting of titanium and zirconium oxychlorides and oxysulphates.

8. A vapor phase oxidation catalyst wherein the active portion comprises a mixture of (1) a vanaduim compound selected from a group consisting of alkali metal and ammonium vanadates and (2) at least one member of a group consisting of basic titanium and zirconium salts, precipitated upon a carrier.

9. A process of producing a vapor phase oxidation catalyst which comprises coating an active portion upon a suitable carrier by combining an alkaline vanadate with a member of a group consisting of titanium and zirconium oxychlorides and oxysulphates in aqueous solution or suspension, and depositing the resulting precipitate upon the carrier.

10. A process of producing a vapor phase oxidation catalyst which comprises coating an active portion upon a suitable carrier by combining an alkaline vanadate with a member of a group consisting of titanium and zirconium oxychlorides and oxysulphates in aqueous solution or suspension, depositing the resulting precipitate upon the carrier and dehydrating the precipitate by heating.

ALFRED PONGRATZ.